Oct. 25, 1932.  W. H. NOELTING  1,884,142

HEAVY DUTY CASTER

Filed July 23, 1931

INVENTOR.
WILLIAM H. NOELTING.

BY
Lockwood Lockwood Goldsmith & Galt
ATTORNEYS.

Patented Oct. 25, 1932

1,884,142

UNITED STATES PATENT OFFICE

WILLIAM H. NOELTING, OF EVANSVILLE, INDIANA, ASSIGNOR TO FAULTLESS CASTER COMPANY, OF EVANSVILLE, INDIANA, A CORPORATION

HEAVY DUTY CASTER

Application filed July 23, 1931. Serial No. 552,687.

This invention relates to a plate caster for so-called relatively light duty, but constructed as of the heavy duty type.

The chief object of this invention in common with casters of a similar general nature, is to provide a plate caster construction with load sustaining anti-friction elements and thrust absorbing anti-friction elements, so that cocking of the caster horn or yoke is substantially prevented in a construction wherein the anti-friction elements constitute the locking connection between the yoke and the top plate.

One feature of the invention consists in the provision of hardened ball contact surfaces associated with the yoke and separately formed therefrom, because it has been found commercially impractical or too expensive to harden the yoke surface which is operatively engageable by the balls or anti-friction elements, because the yoke material is of a softer stock than the plate material due to the requirement that the yoke be formed by bending extended portions into ear formation. The plate may be formed of heavier stock and since it requires no great deformation in its formation, may be of a material that can be hardened when necessary or may be initially sufficiently hard for anti-friction element contact.

Another feature of the invention consists in arranging the several parts so that the several anti-friction constructions may be lubricated.

The full nature of the invention will be understood from the accompanying drawing and the following specification and claims:—

In the drawing, Fig. 1 is a central sectional view of a plate caster embodying the invention, the wheel and a portion of the yoke being shown in elevation.

Figure 1:
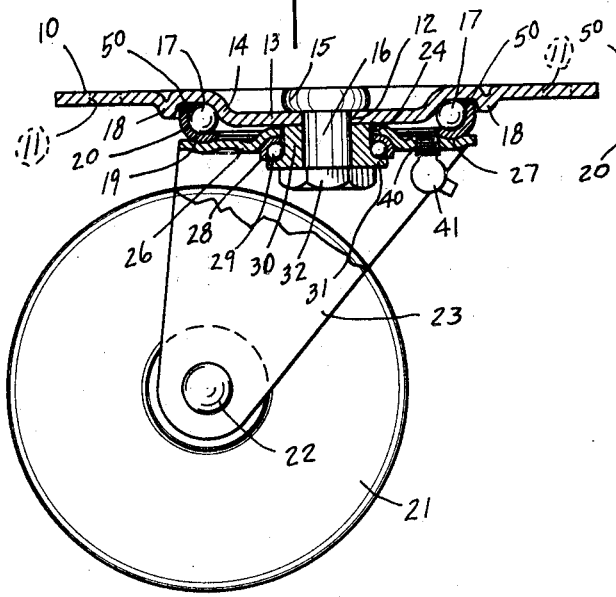
Figure 2:
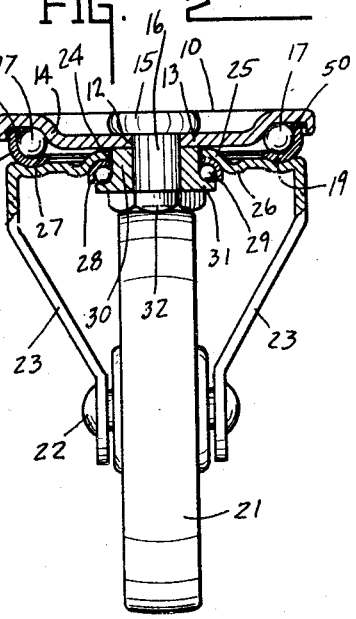
Fig. 2 is a similar view of the invention, taken at right angles to Fig. 1.
Figure 3:
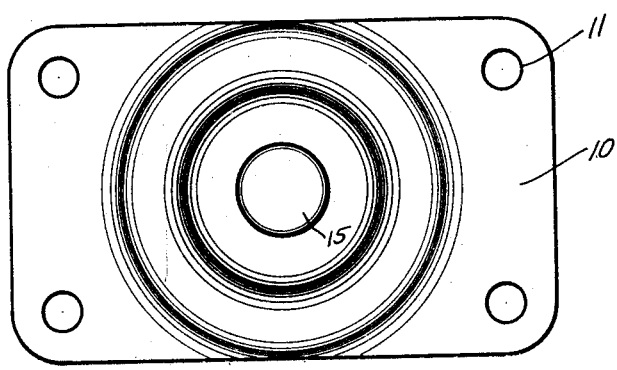
Fig. 3 is a top plan view of the caster with the wheel omitted.

In the drawing, 10 indicates a plate which, in the present form, is shown substantially rectangular in outline and at each corner is provided with an anchoring opening 11, adapted to receive bolts, screws or like anchoring members. The plate includes a king-pin receiving opening 12 and concentric therewith is a depressed portion 13 with an upwardly directed side wall 14. The depressed portion is adapted to nest the enlargement 15 of the king-pin which herein is shown as a bolt 16. The lower and outer surface of the portion 14 is engageable by an annular series of load bearing balls 17.

Concentric with the depressed portion and wall 14 is a downwardly directed annular ridge 18 which serves as a retainer for a ball retainer and the locater for the same. The ball retainer consists of an arcuately sectioned, annular, hardened metal member having the lower portion 19 and the upwardly extending portion 20 which is continued and extends into the annular ball receiving groove formed between the portions 14 and 18 of the top plate. The balls engage the top plate on their inner sides and their upper sides and the retainer on their lower sides and their outer sides, so that the balls diametrically contact the two opposed surfaces.

The caster wheel 21 is mounted upon axle 22 carried by the inwardly directed arms 23 forming the ears of a yoke construction having the central opening 24 defined by an upwardly directed portion 25 that is extended downwardly as at 26, said portions being concentric with the opening 24. Also, near the outer edges of the yoke, the same is provided with an annular groove 27 in its upper face, which nestingly receives or locates the ball retainer 20. A similar ball retainer 28 is inverted and is nestingly received by the portions 25 and 26 of the yoke. An annular series of balls 29 engages the inner and lower surface of said retainer 28.

The spacing sleeve 30 bears at one end against the lower portion of the depressed portion 13 of the plate and includes an outwardly directed lower flange 31 and the lower series of balls bears inwardly against the sleeve and downwardly against the flange. This spacing sleeve construction is preferably of hardened metal. A nut 32 is mounted upon the lower end of the bolt and this completes the king pin construction. The yoke is swivably secured to the top plate through the lower annular series of locking balls 29 and constitutes the sole lock therebetween. Said lower series of annular balls is also provided for thrust purposes and prevents cocking of the yoke with respect to the swivel axis. This construction is provided, because the axis of the wheel axle is eccentric to the swivel axis or offset therefrom.

The foregoing construction provides that a relatively short ridge 18 may be formed in the plate and thus a material saving in stock is obtained therefrom. The ball retainer 20 is thus located by the portion 18 and the groove 27. The ball retainer 28 is located by the portions 25 and 26 so that the ball race constructions are located by a single element and coaxially located. It will also be noted that the extension of the ball retainer 20 extends upwardly so that it telescopes within the portion 18 of the top plate and provides a guard for the balls in addition to retaining the balls in load sustaining relation. This guard prevents the entrance of dirt, lint, threads and the like from passing between the yoke and the top plate and accumulating within the space therebetween.

When it is desired to provide a lubricated construction, the yoke is provided with a threaded opening 40—see Fig. 1—and rigidly mounted therein is a pressure operable lubricant supplying fixture 41 of either the present standard commercial types, commercially known as "Alemite" or "Zerk" fixtures, the latter being illustrated herein. Inasmuch as lubricant is supplied under pressure to the chamber formed by the top plate, the yoke and the upper and outer ball retainer 20, there is also provided on the top of the ball retainer a sealing member 50 which may be of felt, or the like, and cemented to the top of the ball retainer or otherwise suitably secured thereto.

It will be noted from the drawing that the lower end of the ball retainer 20 is at a lower elevation than the upper surface of the projection 24 of the yoke. Lubricant, therefore, will be retained in the annular chamber construction formed between the portion 26 and the inner end of the ball retainer 20 and thus lubricant will be supplied to the load sustaining balls even after the supply to the lower series of balls has ceased. The lower series of balls will receive lubricant through the opening 24 by the overflow of lubricant when the latter is supplied to the annular chamber just mentioned.

The invention claimed is:—

1. In a plate caster, the combination of a top having a retaining pin receiving hole, a depressed portion adjacent thereto for nesting an enlargement of the retaining pin head and a concentric depressed portion in spaced relation thereto for forming an included raceway and for race retainer retention, a caster yoke including a retaining pin receivable hole axially registering with the plate hole, and having an annular groove concentric therewith and in the upper face of the yoke for race retainer seating, a curved, sectioned annular ball race forming member and retainer located in said groove and extended upwardly for telescopic reception within the retainer portion of the plate for retainer location, an upper series of balls retained by the retainer and the lower wall of the first mentioned depressed plate portion and protected by said retainer, a spacing sleeve construction extending through the yoke hole and bearing on the plate and including a lower outwardly extending portion for ball retention and operative ball contact, a similar but inverted ball race forming retainer member, a lower series of balls interposed between the outwardly directed portion and the inverted retainer and constituting the lock for securing the yoke to the plate, said yoke including a concentric upwardly directed portion for nestingly receiving the inverted retainer, and a retaining-pin construction mounted in the sleeve and plate and including spaced enlarged portions.

2. In a caster, the combination of a top plate having a retaining pin receiving hole and a concentric downwardly directed race retainer portion, a caster yoke including a retaining pin receiving hole and an annular race retainer portion offset from the plane of the yoke and concentric with the retaining pin hole, a retaining pin construction extending through both holes and including spaced enlarged portions, a race retainer operatively associated with both retainer locating portions for definitely locating and maintaining the retainer coaxial with the retaining pin, an upper series of balls in said retainer and guarded thereby and operatively interposed between plate and yoke for load purposes, said yoke including an inner, lower, coaxial annular race retainer locating portion upon its lower face, a race retainer coaxially and definitely located thereby, and a lower series of balls operatively interposed between the lower enlargement of the retaining pin construction and the race retainer for lateral thrust purposes.

3. In a caster the combination of a top plate having a retaining pin receiving opening, a depressed portion contiguous thereto and an elevated groove portion, the inner portion of the groove serving as the inner contact surface for an upper and outer series of balls and the outer portion of the groove operatively serving as a ball retainer and preventing ball escapement, an upper and outer series of balls engaged and retained by the groove, a caster yoke having an opening for retaining pin reception, a sleeve including a lower and lateral enlargement and mounted in the yoke opening and engaging the lower face of the plate, an annular groove for upper and outer ball mounting, an inverted ball retainer nested beneath and by the lower face of the yoke, a lower and inner series of balls interposed between the sleeve and the lateral enlargement thereof and the inverted ball retainer, and a retaining pin construction including spaced enlargements, one operatively bearing upon the sleeve and the other being nested in the depressed portion of the plate.

In witness whereof, I have hereunto affixed my signature.

WILLIAM H. NOELTING.